UNITED STATES PATENT OFFICE.

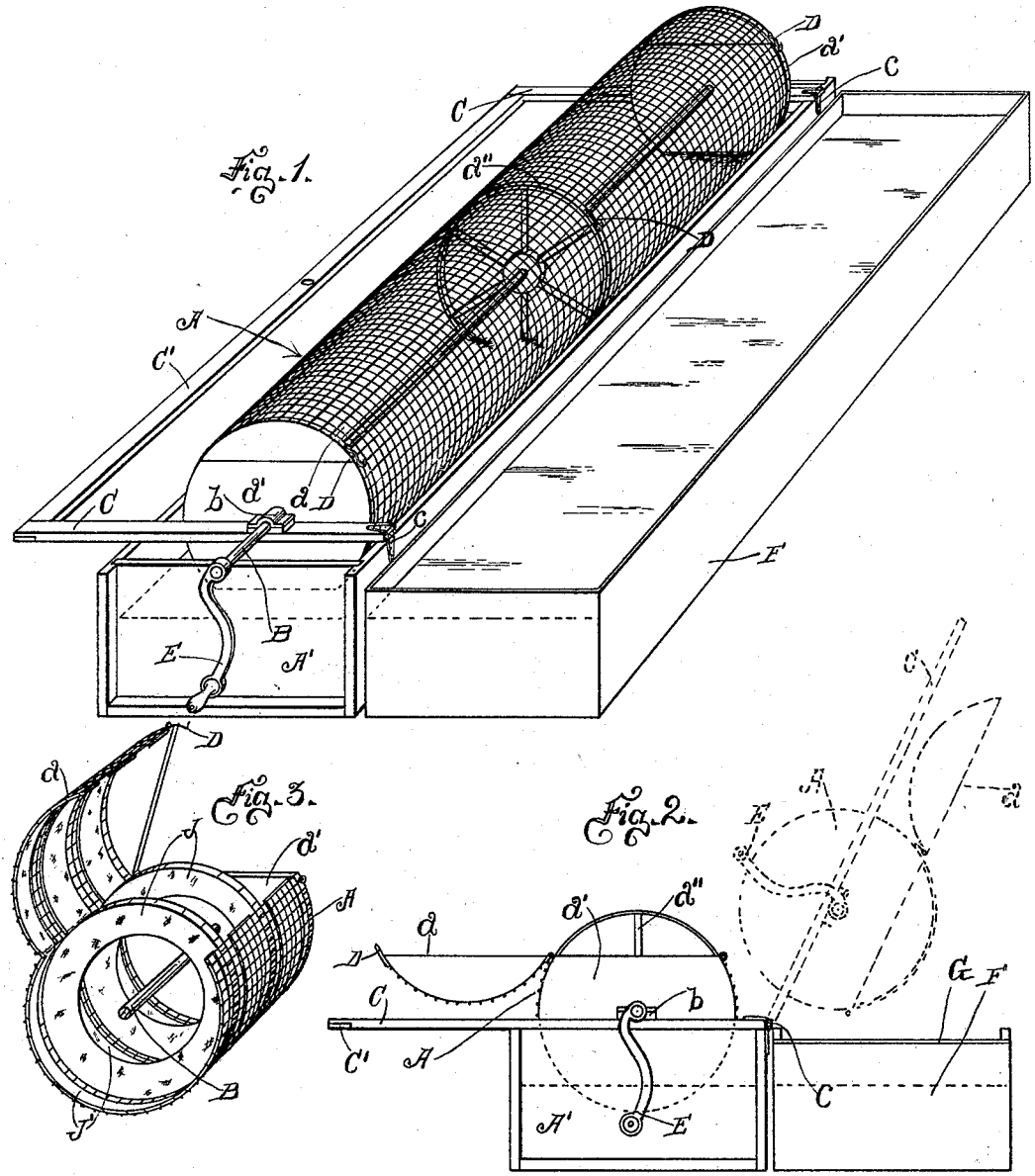

LEWIS R. BUTLER, OF LAMANDA PARK, CALIFORNIA.

NUT OR FRUIT WASHER.

SPECIFICATION forming part of Letters Patent No. 542,438, dated July 9, 1895.

Application filed December 11, 1894. Serial No. 531,457. (No model.)

*To all whom it may concern:*

Be it known that I, LEWIS ROBERT BUTLER, a citizen of the United States, residing at Lamanda Park, in the county of Los Angeles and State of California, have invented new and useful Improvements in Nut or Fruit Washers, of which the following is a specification.

My invention relates to those devices which are employed for the purpose of cleansing fruit and nuts from dust, smut, or other injurious matter which accumulates thereupon.

My invention is also adapted for use in peeling fruit with lye, and is especially adapted for cleansing English walnuts, which require to be washed in order to place them in attractive condition for market.

The object of my invention is to provide means whereby the handling of the cylinder in which the fruits or nuts are treated is facilitated; and my invention consists of the particular means I employ whereby I am enabled to swing the cylinder from one vat to another without the use of tackle or derricks and the consequent loss of time, thus permitting of washing and rinsing the nuts or fruits without emptying them from one receptacle to another.

The accompanying drawings illustrate my invention.

Figure 1 is a perspective view of a washer embodying my invention. Fig. 2 is an end view of the same. Fig. 3 is a fragmental view of one end of the cylinder, showing it arranged for washing fruits, such as oranges or lemons.

In the drawings, A represents a wire-mesh cylinder, which is provided with a suitable door $a$, which is hinged by its ends to the ends $a'$ $a'$ of the cylinder and intermediately to the centrally-arranged cylinder-supporting ring $a''$, and is adapted to swing back upon its hinges, as illustrated in Fig. 2. This cylinder is supported upon a shaft B, which is secured axially in such cylinder, and is secured in suitable journals $b$, which are bolted to the cylinder-tilting levers C C. These levers are pivoted or hinged to one side of the vat or trough A by means of hinges $c$ $c$ and project outward a distance beyond the trough upon the other side, and are connected with each other by means of the bar C' to furnish convenient hand-hold for the operators when tilting the cylinder to discharge the contents therefrom.

In practice, in cleansing English walnuts or other nuts, the door is swung back upon its hinges, as illustrated in Fig. 2, and the nuts are placed in the cylinder until it is suitably filled. Then the door is closed and secured by the locking devices D, and the cylinder is rotated by power applied to the crank E or by any other suitable means. By the rotation of the cylinder the nuts are immersed in the liquid which has been previously placed in the trough or vat A', and as the cylinder revolves the nuts are shifted and rolled one upon another, thus constantly presenting a different series of nuts to the action of the liquid within the trough, while the abrasion of the surfaces of the nuts upon each other and against the wire cylinder causes scouring and rapid removal of all the impurities from the surface thereof. Only sufficient liquid is placed in the trough to immerse from two to three inches of the bottom of the cylinder and its contents. If the cylinder is immersed too deep in the liquid, it is very hard to turn and the nuts are not so effectively cleaned and scoured as they are when only the lower portion of the cylinder is immersed.

In practice the work is very perfectly accomplished in from one to two minutes.

When the cleansing has been accomplished, the door $a$ is opened, as illustrated in Fig. 2. The operators grasp the cross-bar C' or the levers C C, and lift the cylinder, with its contents, upward and outward from the trough, and then the contents of the cylinder are discharged upon suitable trays G, which are shown in Fig. 2 arranged upon the top of the vat F. The position of the cylinder when discharging its contents is indicated in dotted lines in Fig. 2.

When it is desired to peel fruit by means of a lye bath, the lye is placed in the iron vat F, which is arranged alongside of the vat A', as shown in Figs. 1 and 2, and the cylinder is placed in such lye-vat by shifting the cylinder-tilting levers C C, so that they extend across the vat F in the same manner in which they are shown extended across the vat A' in Fig. 1. It will be understood that the lye bath is heated by any suitable means; but such means do not constitute any part of my invention and illustration thereof is not necessary herein.

The fruit is placed in the cylinder as hereinbefore described and the cylinder is rotated in the lye until the fruit is properly peeled, when the cylinder-tilting levers are again operated to swing the cylinder into the vat A', which is filled with clear water, and the cylinder is again rotated to rinse the lye from the fruit. Trays G (shown in Fig. 2) are placed across the vat F and the cylinder is elevated, as shown in dotted lines in Fig. 2, and the fruit is dumped therefrom upon the trays and is ready to be sulphured and dried in the usual manner.

One especial advantage which my machine possesses is that by reason of the rotating cylinder the fruit is constantly shifted and all the surface of the fruit is exposed to the action of the lye. This is not possible where the fruit is placed in the receptacle and simply dipped into the lye, for the reason that by this means the fruit while in the lye is not shifted to any great degree and the pressure of the fruit against each other prevents the entrance of the lye in between the fruit where it is in contact, and the consequence is that if the fruit is permitted to remain in the lye a sufficient length of time to cut the skin where the fruit is in contact with each other that portion of the fruit which is fully exposed to the action of the lye becomes partially cooked and is injured to such a degree as to injure the quality of the fruit. This objection is entirely overcome by my invention, in which only a small portion of the fruit—that at the bottom of the cylinder—is immersed in the lye at any time, and the rapid revolution of the cylinder and the constant shifting of the fruit upon each other causes all the fruit to be equally exposed to the action of the lye, and as soon as the skin becomes tender it is broken by this rubbing contact, and the fruit is placed quickly in condition for perfect drying.

It will, of course, be understood that the operators, or one of them, can hold the door out of the way when emptying the cylinder, or, if simply unfastened, the contents will push the door open by its own weight. This is easily understood and is not illustrated.

When it is desired to cleanse fruit, such as oranges or lemons, a series of annular partitions J, which are covered with carpet or other suitable material, are arranged to divide the cylinder into numerous small divisions, as shown in Fig. 3, and as the cylinder is rotated the fruit rubs between the carpeted partitions and is thoroughly and quickly cleaned. Strips of carpet J' are secured to the cylinder between the partitions to keep the fruit from coming into contact with the wire walls of the cylinder.

By journaling the cylinder in a frame which is arranged to be operated to lower the cylinder into the trough or vat and to elevate it therefrom I am enabled to perform the work in an expeditious manner and with very little labor.

While I consider the wire-cloth cylinder shown to be the best, I do not limit myself to any especial form of cylinder, so that it is suitable for the purpose.

Now, having described my invention, what I claim as new, and desire to secure by Letters Patent, is—

The nut and fruit washer set forth comprising two vats arranged side by side; pivoted cylinder supporting levers arranged to extend across either of such vats; a cylinder journaled upon such levers and adapted to be placed in and removed from either vat by swinging the levers upon their pivots.

L. R. BUTLER.

Witnesses:
ALFRED I. TOWNSEND,
F. M. TOWNSEND.